(12) United States Patent
Jain et al.

(10) Patent No.: US 9,276,267 B2
(45) Date of Patent: Mar. 1, 2016

(54) LOW-TEMPERATURE BONDING OF REFRACTORY CERAMIC LAYERS

(75) Inventors: Kailash C. Jain, Troy, MI (US); Rick D. Kerr, Fenton, MI (US); Bryan Gillispie, Macomb Township, MI (US); Mohammad Parsian, Swartz Creek, MI (US); Joseph M. Keller, Grand Blanc, MI (US); David A. Thompson, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 2233 days.

(21) Appl. No.: 12/284,499

(22) Filed: Sep. 23, 2008

(65) Prior Publication Data
US 2010/0075194 A1   Mar. 25, 2010

(51) Int. Cl.
*H01M 4/80* (2006.01)
*H01M 4/86* (2006.01)
(Continued)

(52) U.S. Cl.
CPC .......... *H01M 4/8657* (2013.01); *H01M 4/8889* (2013.01); *H01M 4/9016* (2013.01); *H01M 4/9033* (2013.01); *H01M 8/1253* (2013.01); *H01M 2004/8689* (2013.01); *H01M 2008/1293* (2013.01); *Y02E 60/521* (2013.01); *Y02E 60/525* (2013.01)

(58) Field of Classification Search
CPC ............ H01M 4/8657; H01M 4/8889; H01M 4/9016; H01M 4/9033; H01M 8/1253; H01M 2004/8689; H01M 2008/1293; Y02E 60/21; Y02E 60/525

USPC .................................................. 429/479–497
See application file for complete search history.

(56) References Cited

U.S. PATENT DOCUMENTS 4,612,297 A * 9/1986 Kasai et al. ................... 501/96.2
2002/0177031 A1 11/2002 Doshi et al.
(Continued)

FOREIGN PATENT DOCUMENTS

| DE | 4237519 | 3/1994 |
|---|---|---|
| EP | 1791211 | 5/2007 |
| WO | 2005122300 | 12/2005 |

OTHER PUBLICATIONS

Subhash C. Singhal & Kevin Kendall, "High Temperature Solid Oxide Fuel Cells; Fundamentals, Design and Applications," pp. 42-44, Elsevier Ltd. 2003.

(Continued)

*Primary Examiner* — Milton I Cano
*Assistant Examiner* — Stephen Yanchuk
(74) *Attorney, Agent, or Firm* — Thomas H. Twomey

(57) ABSTRACT

A cathode of a solid-oxide fuel cell includes a first ionic conducting layer, a second layer deposited over the first layer and formed from a mixed ionic and electronic conductor layer including an oxygen ion conducting phase, and a third layer deposited over the second layer and formed from a mixed ionic and electronic conductor layer. A sintering aid and pore formers are added to the second layer and the third layer to establish ionic, electronic, and gas diffusion paths that are contiguous. By adjusting the microstructure of the second and the third layer, a high performance low resistance cathode is formed that bonds well to the electrolyte, is highly electrocatalytic, and has a relatively low overall resistance. By using inexpensive and readily available substances as sintering aid and as pore formers, a low-cost cathode is provided.

8 Claims, 2 Drawing Sheets

(51) Int. Cl.
*H01M 4/88* (2006.01)
*H01M 4/90* (2006.01)
*H01M 8/12* (2006.01)

(56) References Cited

U.S. PATENT DOCUMENTS

2005/0214612 A1 9/2005 Visco et al.
2008/0220996 A1* 9/2008 Duenckel et al. ............ 507/271
2009/0148743 A1* 6/2009 Day et al. ..................... 429/33

OTHER PUBLICATIONS

B.C.H. Steele & J.-M Bae, "Properties of La0.6Sr0.4Co0.2Fe0.8O3-δ (LSCF) double layer cathodes on gadolinium-doped cerium . . . ," Solid State Ionics, 106, pp. 255-261, 1998.

A. Esquirol, J. Kilner, N. Brandon, "Oxygen transport in La0.6Sr0.4Co0.2Fe0.8O3-δ/Ce0.8Gd0.2O2-x composite cathode for IT-SOFCs," Solid State Ionics, 175, pp. 63-67, 2004.

E.P. Murray, M.J. Sever, S.A. Barnett, "Electrochemical performance of (La,Sr) (Co,Fe)O3—(Ce,Gd)O3 composite cathodes," Solid State Ionics, 148, pp. 27-34, 2002.

K. Murata, T. Fukui, H. Abe, M. Naito, K. Nogi, "Morphology control of La(Sr)Fe (Co)O3-a cathodes for IT-SOFCs," Journal of Power Sources, 145, pp. 257-261, 2005.

A. Mai, M. Becker, W. Assenmacher, F. Tietz, et al, "Time-dependent performance of mixed-conducting SOFC cathodes," Solid State Ionics, 177 pp. 1965-1968, 2006.

C. Falamaki, et al, "Dual behavior of CaCO3 as porosifier and sintering aid in the manufacture of . . . ," Journal of the European Ceramic Society, vol. 24, pp. 3195-3201, 2004.

T.S. Zhang, J. MA, et al, "Iron oxide as an effective sintering aid and a grain boundary scavenger for ceria-based electrolytes," Solid State Ionics, 167, pp. 203-207, 2004.

EP Search Report dated Nov. 19, 2009.

Kim J-H et al: "Fabrication and characteristics of anode-supported flat-tube solid oxide fuel cell" Journal of Power Sources, Elsevier SA, CH, vol. 122, No. 2, Jul. 23, 2003, pp. 138-143, XP004437055, ISN: 0378-7753, *abstract* *Figure 3*.

* cited by examiner

LOW-TEMPERATURE BONDING OF REFRACTORY CERAMIC LAYERS

RELATIONSHIP TO GOVERNMENT CONTRACTS

The present invention was supported in part by a U.S. Government Contract, No. DE-FC26-02NT41246. The United States Government may have rights in the present invention.

TECHNICAL FIELD

The present invention relates to fuel cells; more particularly, to fuel cells having a solid-oxide electrolyte layer separating an anode layer from a cathode layer; and most particularly, to a high performance low resistance three layer cathode and to a method for low-temperature bonding of refractory ceramic layers.

BACKGROUND OF THE INVENTION

Fuel cells, which generate electric current by the electrochemical combination of hydrogen and oxygen, are well known. In one form of such a fuel cell, an anodic layer and a cathodic layer are separated by an electrolyte formed of a ceramic solid oxide. Such a fuel cell is known in the art as a Solid-Oxide Fuel Cell (SOFC). SOFC systems derive electrical power through a high-efficiency conversion process from a variety of fuels including natural gas, liquefied petroleum gas, ethanol, and other hydrocarbon and non-hydrocarbon fuels. Hydrogen, either pure or reformed from hydrocarbons, is flowed along the outer surface of the anode and diffuses into the anode. Oxygen, typically from air, is flowed along the outer surface of the cathode and diffuses into the cathode.

Each $O_2$ molecule is split and reduced to two $O^{-2}$ anions catalytically at the cathode/electrolyte interface. The oxygen anions diffuse through the electrolyte and combine with four hydrogen ions at the anode/electrolyte interface to form two molecules of water. The anode and the cathode are connected externally through a load to complete the circuit whereby electrons are transferred from the anode to the cathode.

When hydrogen as a feed stock for the fuel cell is derived by "reforming" hydrocarbons, such as from gasoline, diesel fuel, natural gas, or methane, in the presence of limited oxygen, the reformate gas produced includes CO which is converted to $CO_2$ at the anode/electrolyte interface. Since a single fuel cell is capable of generating a relatively small amount of voltage and wattage, in practice, it is known to stack a plurality of fuel cells together in electrical series.

Present anode supported SOFC technology uses a dense ceramic solid electrolyte membrane, for example yttria stabilized zirconia (YSZ), over which a cathode electrode consisting of an ionic conducting layer and a porous catalyst, such as a mixed ionic and electronic conductor (MIEC), is deposited. The cathode material is predominantly an electronic conductor with some ionic conductivity. At the cathode, oxygen is reduced and the ionic species pass through the electrolyte membrane to the anode where a fuel is oxidized to produce power. The resistance of the cathode, ohmic and polarization, plays a major role in the overall cell resistance and, therefore, can greatly affect electrochemical performance of the cell.

One prior art approach to decrease the cathode resistance (polarization) is to add a doped (Sm, Gd, Nd, Y, etc.) ceria based ionic conducting phase to the mixed ionic and electronic conductor (MIEC) material. While such cathodes may have an initially lower polarization resistance, the polarization resistance increases at elevated cell temperatures as low as about 800° C. In addition, such cathodes are structurally weak and tend to delaminate under certain conditions.

Another prior art approach is to modify the geometry of the cathode to a three layer configuration that includes an ionic conductor layer, a dual phase layer including the mixed ionic and electronic conductor (MIEC) material and ionic conducting material, and a mixed ionic and electronic conductor (MIEC) layer. Such a fuel cell is still susceptible to delamination and the power performance is not improved.

Therefore, cathodes of current solid oxide fuel cells have a high resistance (ohmic and polarization) and, thus, a relatively low power output due to poor adhesion, low ionic conductivity, and an insufficient microstructure of the cathode. Poor adhesion may result in the delamination of the cathode from the electrolyte surface, which may lead to a drastic reduction in output power and even cell failure.

What is needed in the art is a cathode of a solid oxide fuel cell with improved bonding to the electrolyte, that is highly electrocatalytic, and that is porous with contiguous electronic, ionic, and gas diffusion paths.

It is a principal object of the present invention to provide a cathode for a solid-oxide fuel cell that enables significant improvement of the power density of such fuel cell and that has an improved durability.

It is a further object of the invention to provide a method for low-temperature bonding of refractory ceramic layers.

SUMMARY OF THE INVENTION

Briefly described, a cathode for a solid oxide fuel cell has a three layer structure that overcomes the low adhesion, the high resistance, the low catalytic activity, and the microstructure related shortcomings of known prior art cathodes.

In one aspect of the invention, the adhesion of the cathode to the electrolyte surface is improved by adding a sintering aid to a center layer that is formed from a mixed ionic and electronic conductor (MIEC) material with an added ionic conducting phase and to a top layer that is formed from a mixed ionic and electronic conductor (MIEC) material. The sintering aid is preferably an alkaline earth metal ion from the group IIA of the periodic table.

In addition, pore formers may be added to the center and the top layer to control the microstructures and porosity of these layers. The combined effect of the sintering aid and the pore formers yields a microstructure that has a relatively low tortuosity. Pore formers are materials such as carbon black, starch, graphite, and the like, non-soluble organics, and other appropriate materials that decompose to leave the desired porosity in the sintered layer.

The overall resistance of the cathode in accordance with the invention is further reduced by including an oxygen ion conducting phase in the composition of the center layer. For this purpose, a mechanical mixture of an ionic conducting phase, for example samaria doped ceria (SDC), and a mixed ionic and electronic conductor, for example lanthanum strontium cobaltite ferrite (LSCF) is prepared. Alternatively, a more homogeneous mixture can be prepared via liquid phases using soluble salts or through solid-state sintering and milling.

Similarly, the composition of the mixed ionic and electronic conductor (MIEC) material, such as LSCF, of the top layer may be varied in terms of relative amounts of its constituents while maintaining a pervoskite structure. The LSCF material may be deficient in A-sites or even a mixture of the two-phase pervoskite structures arising from a large deficiency in A-sites in the crystal structure.

In another aspect of the invention, relatively low sintering temperatures are applied to avoid the formation of resistive phases at the electrode/electrolyte surfaces, to maximize population of active sites by avoiding excessive grain growth, and to maintain high catalytic activity while creating continuous ionic, electronic, and gas diffusion paths that are facile.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

The advantages and benefits afforded to an anode supported solid-oxide fuel cell with a three-layer cathode in accordance with the invention may be better appreciated by first considering prior art anode supported solid-oxide fuel cells. Such fuel cells generate electric current by electrochemical combination of hydrogen and oxygen and include an anode electrode and a cathode electrode separated by an electrolyte formed of a ceramic solid oxide.

Figure 1:
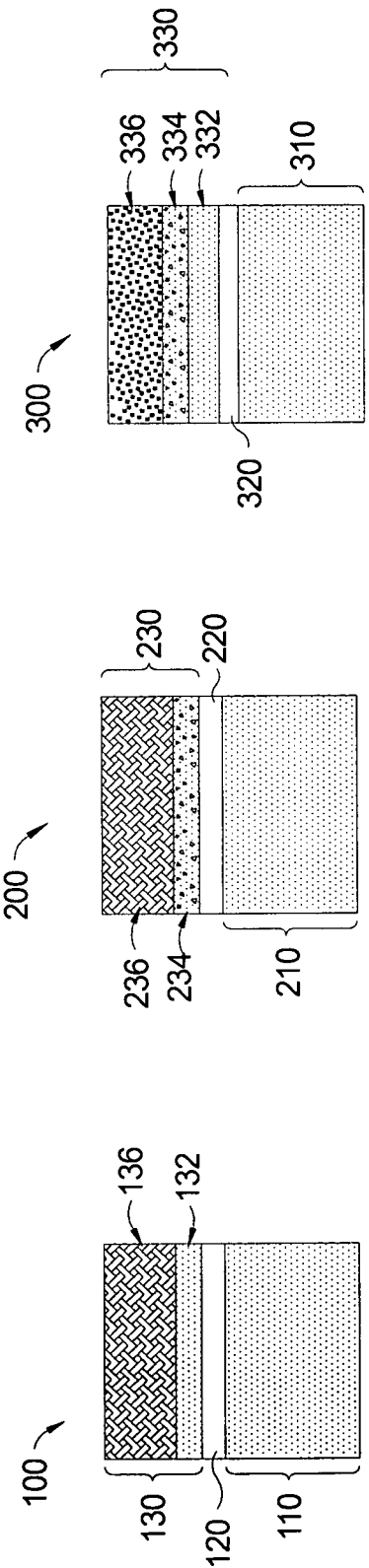
FIG. 1A is a schematic cross-sectional view of a first prior art anode supported solid-oxide fuel cell.
FIG. 1B is a schematic cross-sectional view of a second prior art anode supported solid-oxide fuel cell.
FIG. 1C is a schematic cross-sectional view of a third prior art anode supported solid-oxide fuel cell.

Referring to FIG. 1A, a first prior art anode supported solid-oxide fuel cell 100 includes an anode 110 that supports an electrolyte 120 consisting of a yttria stabilized zirconia (YSZ) plate. Anode 110 is typically a nickel-yttria stabilized zirconia (Ni—YSZ) substrate. Electrolyte 120 separates anode 110 from cathode 130. Cathode 130 is a dual layer cathode. Cathode 130 includes an ionic conducting layer 132 that is typically ceria based and doped with, for example samarium (Sm), Gadolinium (Gd), neodymium (Nd), or yttrium (Y). A porous catalyst, which is a mixed ionic and electronic conductor (MIEC) layer 136, is deposited over ionic conducting layer 132. Lanthanum strontium cobaltite ferrite (LSCF) may be used as material for MIEC layer 136. If LSCF is used as material for cathode 130, an initially lower polarization resistance of cathode 130 increases as the operating temperature of fuel cell 100 approaches about 800° C. due to the formation of $SrZrO_3$, since LSCF reacts with YSZ at temperatures as low as about 800° C. Tape pull tests have shown that cathode 130 is structurally weak and tends to delaminate from the surface of electrolyte 120.

Referring to FIG. 1B, a second prior art anode supported solid-oxide fuel cell 200 includes an anode 210 that supports an electrolyte 220. Both anode 210 and electrolyte 220 may be formed from the same substances as anode 110 and electrolyte 120 of fuel cell 100, as described above. Electrolyte 220 separates anode 210 from a cathode 230. Cathode 230 is also a dual layer cathode. Cathode 230 includes a layer 234 where a doped (Sm, Gd, Nd, Y etc.) ceria based ionic conducting phase is added to an MIEC material, such as LSCF. Similar to fuel cell 100, a mixed ionic and electronic conductor (MIEC) layer 236, is deposited over layer 234 as a porous catalyst. Since in fuel cell 200, the LSCF material of layer 234 is in direct contact with YSZ electrolyte 220, fuel cell 200 is more susceptible to the formation of $SrZrO_3$ than fuel cell 100 as illustrated in FIG. 1A, since LSCF reacts with YSZ at temperatures as low as about 800° C. As a result, fuel cell 200 is considered less reliable than fuel cell 100. In addition, tape pull tests have shown that cathode 230 is also structurally weak and tends to delaminate from the surface of electrolyte 220.

Referring to FIG. 1C, a third prior art anode supported solid oxide fuel cell 300 includes an anode 310 that supports an electrolyte 320. Both may be formed from the same substances as anode 110 and electrolyte 120 of fuel cell 100, as described above. Electrolyte 320 separates anode 310 from a cathode 330. Cathode 330 is a triple layer cathode. Cathode 230 includes an ionic conducting layer 332, a layer 234 deposited over layer 332 where a doped ceria based ionic conducting phase is added to a MIEC material, such as LSCF, and a MIEC layer 336 deposited over layer 334. Ionic conducting layer 332 is typically ceria based and doped with, for example samarium (Sm), Gadolinium (Gd), neodymium (Nd), or yttrium (Y). Even with the geometry of cathode 330 modified to a three layer configuration, the power performance of fuel cell 300 is not improved compared to the power performance of fuel cells 100 and 200.

As shown in FIGS. 1A through 1C, cathodes 130, 230, and 330 of prior art fuel cells 100, 200, and 300, respectively, have a high resistance (ohmic and polarization) and, thus, a low power output. A reason for the unsatisfactory power performance lies in the poor adhesion of the cathodes to the electrolyte surface, low ionic conductivity, and the microstructure of the cathodes. All of these relationships are known in the art of fuel cell design and need not to be further elaborated here.

Figure 2:
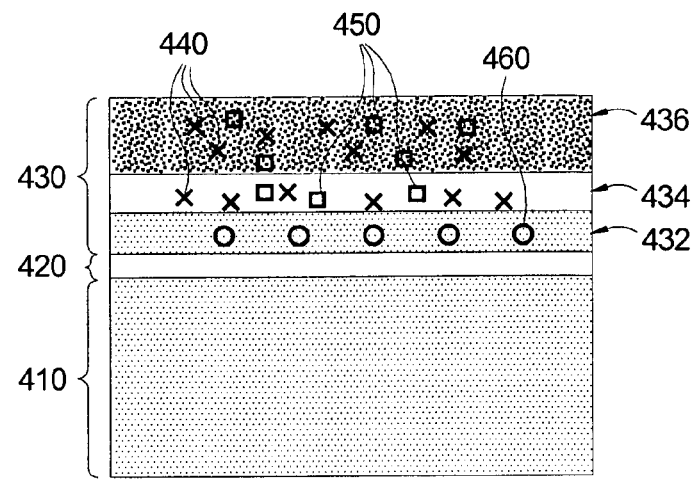
FIG. 2 is a schematic cross-sectional view of an anode supported solid-oxide fuel cell, in accordance with the invention.

Referring to FIG. 2, an anode supported solid-oxide fuel cell 400 in accordance with the invention includes a cathode 430 that has a three layer structure similar to cathode 330 of fuel cell 300, as shown in FIG. 1C. Fuel cell 400 in accordance with the invention also includes an anode 410, for example a nickel-yttria stabilized zirconia (Ni—YSZ) substrate, that supports an electrolyte 420, such as a yttria stabilized zirconia (YSZ) plate. Electrolyte 420 separates anode 410 from cathode 430.

Cathode 430 includes an ionic conducting layer 432, a layer 434 deposited over layer 432 where a doped ceria based ionic conducting phase is added to MIEC material, such as LSCF, and a MIEC layer 436 deposited over layer 434. Ionic conducting layer 432 may be ceria based and doped with, for example samarium (Sm), Gadolinium (Gd), neodymium (Nd), or yttrium (Y).

Adhesion of cathode 430 in accordance with the invention is improved compared to prior art cathode 330 by modifying layers 434 and 436 with a sintering aid 440. The sintering aid 440 is preferably an alkaline earth metal ion from group IIA of the periodic table, such as magnesium (Mg), calcium (Ca), strontium (Sr), and barium (Ba). For example, $CaCO_3$ and $MgCO_3$ or their mixtures have been found to aid in the formation of porous films, are readily available and inexpensive. Other compounds of the alkaline earth metals can be used including aqueous soluble, such as acetates and nitrates, and organic soluble metal-organic compounds to these metals. The amount of the sintering aid 440 contained in the layers 434 and 436 may vary from about 0 wt % (weight percent) to about 10 wt % of solids in the composition, with about 2 wt % to about 6 wt % being the preferred range.

In addition to adding a sintering aid 440, the microstructures of layer 434 and of layer 436 may be controlled by including pore formers 450 in their respective compositions. The purpose of pore formers 450 is to enable the formation of low resistance gas diffusion paths. Pore formers 450 are materials that decompose to leave the desired porosity in the sintered layer, such as layers 434 and 436. For example, carbon black, starch, graphite, and non-soluble organics may be used as pore formers 450. The amount of pore formers 450 may vary from about 0 wt % to about 100 wt % of the solid phase or even higher, with about 10 wt % to about 50 wt % being the preferred range. The constraint on the amount of pore former 450 is the mechanical strength of the resulting films. The combined effect of sintering aid 440 and pore formers 450 yields a microstructure of layers 434 and 436 that has a low tortuosity. The low tortuosity results from rounding of the pores in the porous layers 434 and 436 caused by sintering aid 440 and pore formers 450. By varying the amount of sintering aid 440 and pore formers 450 added to the layers 434 and 436 a desired and application specific microstructure of each of these layers can be achieved without undue experimentation.

In another aspect of the invention, the resistance of cathode 430 is further reduced, compared to prior art cathodes 130, 230, and 330 as illustrated in FIGS. 1A through 1C, by adjusting the composition of layer 434 by mixing an oxygen ion conducting phase 460. For this purpose, a mechanical mixture of an ionic conducting phase, for example samaria doped ceria (SDC), and a mixed ionic and electronic conductor (MIEC) material, for example $La_{0.6}Sr_{0.4}Co_{0.2}Fe_{0.8}O_{3-\delta}$, (LSCF) is prepared. Alternatively, a more homogenous mixture may be prepared via liquid phases using soluble salts, or through solid-state sintering and milling. The ionic conducting phase 460 may be any ceria doped material, such as $Y_2O_3$, $Gd_2O_3$, $Nd_2O_3$, $Yb_2O_3$, etc., with or without a variable-valance cation as a sintering aid, such as iron (Fe), cobalt (Co), and manganese (Mn) oxides. The doping level of ceria may be about 3 mole % to about 30 mole %, with about 10 mole % to about 20 mole % being the preferred range. The amount of ionic conducting phase 460 in the MIEC material may be varied from about 0 wt % to about 60 wt %, with about 25 wt % to about 50 wt % being the preferred range.

In still another aspect of the invention, the composition of the MIEC layer 436 material, for example LSCF, may be varied in terms of relative amounts of its constituents while a pervoskite structure is maintained. The LSCF material of layer 436 may be, for example, deficient in A-sites or may be even a mixture of the two-phase pervoskite structures arising from a relatively large deficiency in A-sites in the crystal structure of layer 436. Other materials that are predominantly electronic conductors, for example LNF, LSC, LSF, LSM, etc. and their combinations, may be used to form MIEC layer 436 instead of LSCF.

Still referring to FIG. 2, relatively low sintering temperatures in the range from about 1000° C. to about 1100° C. are preferably used to form cathode 430 to avoid the formation of resistive phases at the cathode 430 and electrolyte 420 interface, to maximize population of active sites by avoiding excessive grain growth, and to maintain high catalytic activity. The sintering time at these sintering temperatures may be varied from about 10 hours to about 0.5 hours. Decomposition of calcium carbonate (CaO) from the added sintering aid 440 and subsequent diffusion of CaO through ceria film of the ionic conducting layer 432 to the YSZ electrolyte 420 improves the bonding of all three layers 432, 434, and 436 to the surface of electrolyte 420 and shapes the pores within layers 434 and 436 to reduce gas diffusion path resistance.

Figure 3:
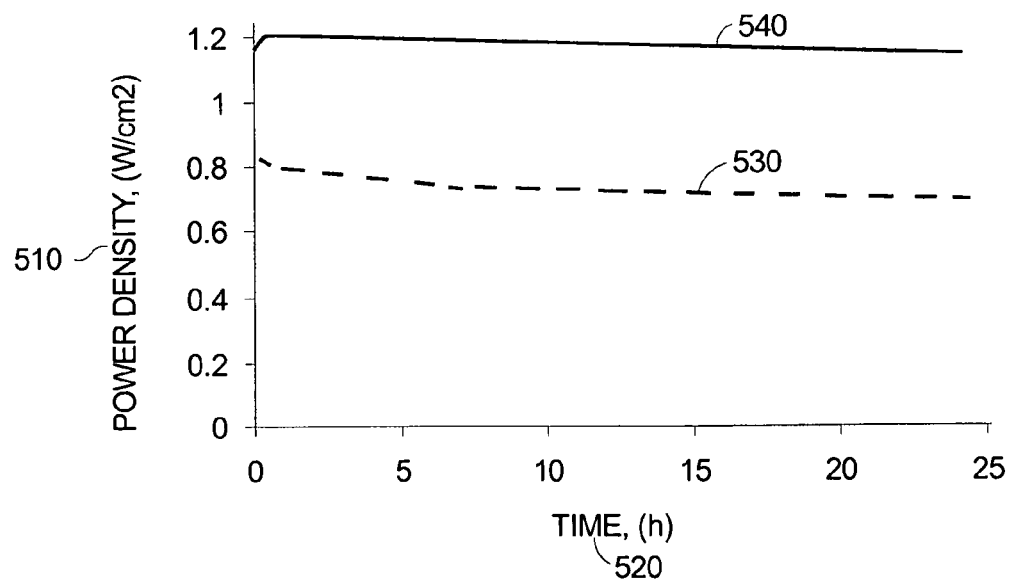
FIG. 3 is a graph comparing power generation characteristics of a prior art fuel cell and a fuel cell in accordance with the present invention.

Referring to FIG. 3, graph 500 compares power generation characteristics of the first prior art fuel cell 100 (as shown in FIG. 1A) and the fuel cell 400 (as shown in FIG. 2) in accordance with the present invention, both operating at 0.7 V (volts) in a fuel mixture of 50% hydrogen ($H_2$) in nitrogen ($N_2$) at 750° C. The power density 510 is illustrated in dependence from the time 520. Trace 530 represents the first prior art fuel cell 100 and trace 540 represents fuel cell 400 in accordance with the invention.

Graph 500 illustrates electrochemical test results of a variety of test fuel cells 400 that were prepared to demonstrate the performance improvements due to the three layer structure of cathode 430 as described above with FIG. 2. The cathodes 430 were build on an YSZ electrolyte 420 supported by a Ni—YSZ substrate acting as an anode 410 for fuel cell 400.

The amounts of $CaCO_3$ as sintering aid 440 and carbon black as pore-former 450 in layers 434 and 436 as well as the amount of the oxygen ion conducting phase 460 in layer 434 were varied to optimize the microstructure of layers 434 and 436. After sintering at temperatures near 1050° C., the total thicknesses of cathode 430 is about 40 μm. One of the advantages of the three layer structure of the cathode 430 in accordance with the invention is that the thickness of cathode 430 could vary over a wide range (>10 μm<100 μm) and still show favorable electrochemical and structural performance as well as structural stability.

As illustrated in FIG. 3, fuel cell 400 in accordance with the invention yields an improvement in power density 510 of about 40 to 50% (trace 540) compared to prior art fuel cell 100 (trace 530). This improvement in power density 510 is achieved by improving the bonding at the interface of cathode 430 and electrolyte 420 and by reducing the ohmic and polarization resistance of the fuel cell shown in FIG. 3. Furthermore, the combination of pore former 450 and sintering aid 440 in both layers 434 and 436 establishes ionic, electronic, and gas diffusion paths that are contagious.

Furthermore, tape pull tests after exposing the test fuel cells 400 to an argon test atmosphere at 1000° C. have shown that the cathodes 430 do not delaminate from the surface of electrolytes 420 contrary to the cathodes 130 of the prior art fuel cells 100.

As can be seen in FIGS. 2 and 3, the application of sintering aid 440, pore formers 450, and an oxygen ion conducting phase 460 in the three layer structure of cathode 400 in accordance with the invention results in a solid-oxide fuel cell 400 where cathode 430 is well bonded to electrolyte 420, is highly electrocatalytic, has a relatively low overall resistance, and is porous with contagious electronic, ionic, and gas diffusion paths. As a result, the power density and the durability of fuel cell 400 are improved compared to prior art fuel cells 100, 200, and 300.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A cathode of a solid-oxide fuel cell, comprising:
a first ionic conducting layer comprising ceria;
a second layer deposited over said first layer;
a third layer deposited over said second layer;

a sintering aid comprising $CaCO_3$ added to said second layer and to said third layer; and pore formers added to said second layer and to said third layer, wherein said pore formers are selected from a group comprising carbon black, starch, graphite, and non-soluble organics;

wherein said cathode is sintered between about 1000° C. to about 1100° C. such that said sintering aid and said pore formers establish ionic, electronic, and gas diffusion paths.

2. The cathode of claim 1 wherein said second layer is formed of a mixed ionic and electronic conductor material and an oxygen ion conducting phase.

3. The cathode of claim 1 wherein said third layer is formed from a mixed ionic and electronic conductor material.

4. The cathode of claim 1, wherein said first layer is deposited over an electrolyte that is supported by an anode.

5. The cathode of claim 4, wherein said electrolyte is an yttria stabilized zirconia plate, and wherein said anode is a nickel-yttria stabilized zirconia substrate.

6. The cathode of claim 2, wherein the material of said second layer is formed of lanthanum strontium cobaltite ferrite with samaria doped ceria added as said oxygen ion conducting phase.

7. The cathode of claim 3, wherein said third layer is formed of lanthanum strontium cobaltite ferrite.

8. The cathode of claim 3, wherein a composition of said third layer is varied in terms of relative amounts of its constituents while a pervoskite structure is maintained.

* * * * *